US009806335B2

(12) United States Patent
Kang et al.

(10) Patent No.: US 9,806,335 B2
(45) Date of Patent: Oct. 31, 2017

(54) COMPOSITE INCLUDING CONDUCTIVE MATERIAL AND BINDER ON SURFACE OF (SEMI) METAL OXIDE AND METHOD OF PREPARING ANODE SLURRY INCLUDING THE SAME

(71) Applicant: LG Chem, Ltd., Seoul (KR)

(72) Inventors: Yoon Ah Kang, Daejeon (KR); Yong Ju Lee, Daejeon (KR); Rae Hwan Jo, Daejeon (KR); Je Young Kim, Daejeon (KR)

(73) Assignee: LG Chem, Ltd. (KR)

( * ) Notice: Subject to any disclaimer, the term of this patent is extended or adjusted under 35 U.S.C. 154(b) by 270 days.

(21) Appl. No.: 14/166,934

(22) Filed: Jan. 29, 2014

(65) Prior Publication Data

US 2014/0154571 A1 Jun. 5, 2014

Related U.S. Application Data

(63) Continuation of application No. PCT/KR2013/010867, filed on Nov. 27, 2013.

(30) Foreign Application Priority Data

Nov. 30, 2012 (KR) .......... 10-2012-0138528
Nov. 26, 2013 (KR) .......... 10-2013-0144588

(51) Int. Cl.
*H01M 4/36* (2006.01)
*H01M 4/38* (2006.01)
*H01M 4/48* (2010.01)
*H01M 4/62* (2006.01)
*H01M 4/485* (2010.01)

(52) U.S. Cl.
CPC .......... *H01M 4/366* (2013.01); *H01M 4/485* (2013.01); *H01M 4/622* (2013.01); *H01M 4/624* (2013.01); *H01M 4/625* (2013.01); *H01M 4/386* (2013.01)

(58) Field of Classification Search
CPC ...... H01M 4/485; H01M 4/622; H01M 4/625; H01M 4/366; H01M 4/624
USPC .... 429/213, 217, 218.1, 222, 223, 228, 231, 429/231.5, 231.7, 231.8; 252/511
See application file for complete search history.

(56) References Cited

U.S. PATENT DOCUMENTS

| 6,001,139 A | 12/1999 | Asanuma et al. |
| 6,733,922 B2 | 5/2004 | Matsubara et al. |
| 2004/0253517 A1 | 12/2004 | Kim et al. |
| 2005/0233213 A1 | 10/2005 | Lee et al. |
| 2006/0068287 A1 | 3/2006 | Morita et al. |
| 2006/0134516 A1 | 6/2006 | Im et al. |
| 2007/0092796 A1* | 4/2007 | Matsuda ............. H01M 4/38 429/217 |
| 2007/0190416 A1 | 8/2007 | Yamada et al. |
| 2009/0023065 A1* | 1/2009 | Hwang ............. H01M 4/1393 429/220 |
| 2010/0203392 A1 | 8/2010 | Yamada et al. |
| 2010/0243964 A1 | 9/2010 | Lee et al. |
| 2011/0068294 A1 | 3/2011 | Zaghib et al. |
| 2011/0091775 A1 | 4/2011 | Lee et al. |
| 2011/0165464 A1 | 7/2011 | Yew et al. |
| 2012/0208083 A1 | 8/2012 | Ati et al. |
| 2013/0071741 A1 | 3/2013 | Ohara et al. |
| 2013/0078490 A1 | 3/2013 | Morita et al. |
| 2013/0244106 A1 | 9/2013 | Chang et al. |
| 2014/0017570 A1 | 1/2014 | Naoi et al. |
| 2014/0120420 A1 | 5/2014 | Zaghib et al. |
| 2014/0170484 A1* | 6/2014 | Fukahori ............. H01M 4/13 429/211 |
| 2014/0242461 A1* | 8/2014 | Hwang ............. H01M 4/366 429/217 |

FOREIGN PATENT DOCUMENTS

| CA | 2786012 A1 | 10/2012 |
| CN | 1304187 A | 7/2001 |
| CN | 101180753 A | 5/2008 |
| CN | 101494284 A | 7/2009 |
| CN | 101796670 A | 8/2010 |
| CN | 101990719 A | 3/2011 |
| CN | 102365774 A | 2/2012 |
| CN | 102593426 A | 7/2012 |
| EP | 1873846 A1 | 1/2008 |
| EP | 2018677 A1 | 1/2009 |
| EP | 2416410 A2 | 2/2012 |
| JP | 2005-135925 A | 5/2005 |
| JP | 2007-165108 A | 6/2007 |
| JP | 2008-210618 A | 9/2008 |
| JP | 2011-204564 A | 10/2011 |
| JP | 2012531025 A | 12/2012 |
| JP | 2013-073764 A | 4/2013 |
| JP | 2014103052 A | 6/2014 |
| KR | 2002-0070764 A | 9/2002 |
| KR | 2005-0090218 A | 9/2005 |
| KR | 10-0578870 B1 | 5/2006 |
| KR | 10-0589309 B1 | 6/2006 |
| KR | 2006-0087003 A | 8/2006 |
| KR | 2007-0109634 A | 11/2007 |
| KR | 2010-0109483 A | 10/2010 |

(Continued)

OTHER PUBLICATIONS

European Search Report from PCT/KR2013/010667, dated Nov. 27, 2014.

(Continued)

*Primary Examiner* — Sean P Cullen
(74) *Attorney, Agent, or Firm* — Lerner, David, Littenberg, Krumholz & Mentlik, LLP

(57) ABSTRACT

Provided are a composite and a method of preparing an anode slurry including the same. More particularly, the present invention provides a composite including a (semi) metal oxide, a conductive material on a surface of the (semi) metal oxide, and a binder, and a method of preparing an anode slurry including preparing a composite by dispersing a conductive material in an aqueous binder and then mixing with a (semi) metal oxide, and mixing the composite with a carbon material and a non-aqueous binder.

15 Claims, No Drawings

(56) References Cited

FOREIGN PATENT DOCUMENTS

| KR | 2012-0093764 A | 8/2012 |
|---|---|---|
| WO | 2007/059687 A1 | 5/2007 |
| WO | 2007/133005 A1 | 11/2007 |
| WO | 2011152263 A1 | 12/2011 |
| WO | 2012/133844 A1 | 10/2012 |

OTHER PUBLICATIONS

International Search Report from PCT/KR2013/010867, dated Mar. 10, 2014.
Lestriez et al, "Functions of polymers in composite electrodes of lithium ion batteries," Comptes Rendus Chimie, Elsevier, Paris, FR, vol. 13, No. 11, Mar. 29, 2010, pp. 1341-1350.
International Search Report from PCT/KR2013/010866, dated Mar. 10, 2014.
Liang Cheng et al.: "General synthesis of carbon-coated nanostructure Li4Ti5O12 as a high rate electrode material for Li-ion intercalation", Journal of Materials Chemistry, Royal Society of Chemistry, GB, vol. 20, No. 3, Jan. 21, 2010, pp. 595-602.
Partial Supplementary European Search Report for Application No. 13834350.4 dated Mar. 9, 2016.
Nahong Zhao et al.: "Preparation of Nanowire Arrays of Amorphous Carbon Nanotube-Coated Single Crystal SnO2", Chemistry of Materials, vol. 20, No. 8, Mar. 18, 2008, pp. 2612-2614, XP055253316.
Extended European Search Report for Application No. EP13834350 dated Sep. 5, 2016.

\* cited by examiner

US 9,806,335 B2

COMPOSITE INCLUDING CONDUCTIVE MATERIAL AND BINDER ON SURFACE OF (SEMI) METAL OXIDE AND METHOD OF PREPARING ANODE SLURRY INCLUDING THE SAME

CROSS-REFERENCE TO RELATED APPLICATIONS

The present application is a continuation of International Application No. PCT/KR2013/010867 filed on Nov. 27, 2013, which claims the benefit of Korean Patent Application No. 10-2013-0144588, filed on Nov. 26, 2013 and Korean Patent Application No. 10-2012-0138528, filed on Nov. 30, 2012, the disclosures of which are incorporated herein by reference.

TECHNICAL FIELD

The present invention relates to a composite and a method of preparing an anode slurry including the same.

BACKGROUND ART

In line with recent miniaturization and lightweight trends in electronic devices, the miniaturization and weight reduction have also been required for batteries acting as a power source. Lithium-based secondary batteries have been commercialized as a battery that may be miniaturized, light weighted, and charged to high capacity, and the lithium-based secondary batteries have been used in portable electronic devices, such as small video cameras, mobile phones, and notebooks, and communication devices.

Lithium secondary batteries, as an energy storage device having high energy and power, may be advantageous in that capacities or operating voltages thereof are higher than those of other types of batteries. However, since the safety of the batteries may be problematic due to the high energy, there may be a risk of explosion or fire. In particular, since high energy and output characteristics are required for hybrid vehicles that have recently been in the spotlight, it may be considered that the safety is more important.

In general, a lithium secondary battery is composed of a cathode, an anode, and an electrolyte, in which charge and discharge may be possible, because lithium ions, which are discharged from a cathode active material by first charging, may act to transfer energy while moving between both electrodes, for example, the lithium ions are intercalated into an anode active material, i.e., carbon particles, and deintercalated during discharging.

Meanwhile, since there is a continuous need for high-capacity batteries due to the development of portable electronic devices, research into high-capacity anode materials, such as tin (Sn) and silicon (Si), which have significantly higher capacity per unit mass than that of carbon that is used as a typical anode material, have been actively conducted. In the case that Si or a Si alloy is used as an anode active material, volume expansion may increase and cycle characteristics may degrade. In order to address the above limitations, the Si or the Si alloy may be mixed with graphite to be used as the anode active material. However, since the graphite may be non-uniformly distributed during the mixing, the cycle characteristics and lifetime may degrade.

DISCLOSURE OF THE INVENTION

Technical Problem

The present invention provides a composite included in an anode active material and a method of preparing an anode slurry including the composite.

Technical Solution

According to an aspect of the present invention, there is provided a composite including: a (semi) metal oxide (metal (loid) oxide); a conductive material on a surface of the (semi) metal oxide; and a binder.

According to another aspect of the present invention, there is provided a method of preparing an anode slurry including preparing a composite by dispersing a conductive material in an aqueous binder and then mixing with a (semi) metal oxide; and mixing the composite with a carbon material and a non-aqueous binder.

Advantageous Effects

According to the present invention, electrical conductivity may be improved by dispersing a conductive material in an aqueous binder and then mixing with a (semi) metal oxide, and a performance, in particular, lifetime characteristics, of a secondary battery may be improved.

MODE FOR CARRYING OUT THE INVENTION

The present invention may provide a composite including a (semi) metal oxide (metal(loid) oxide), a conductive material on a surface of the (semi) metal oxide, and a binder.

The composite according to an embodiment of the present invention may improve electrical conductivity by dispersing a conductive material in an aqueous binder and then mixing with a (semi) metal oxide, and may improve a performance, in particular, lifetime characteristics, of a secondary battery. In the composite according to the embodiment of the present invention, since the aqueous binder is used as a binder material of an anode, it may be economically efficient. Also, since an amount of the (semi) metal oxide included in the anode may be increased, a secondary battery having high capacity may be realized.

Specifically, the binder may be an aqueous binder, and the binder may include one or more selected from the group consisting of a styrene-butadiene rubber, an acrylonitrile-butadiene rubber, an acrylonitrile-butadiene-styrene rubber, carboxymethyl cellulose, and hydroxypropyl methylcellulose.

Also, in the composite according to the embodiment of the present invention, the (semi) metal oxide may include one or more selected from the group consisting of $SiO_x$, $AlO_x$, $SnO_x$, $SbO_x$, $BiO_x$, $AsO_x$, $GeO_x$, $PbO_x$, $ZnO_x$, $CdO_x$, $InO_x$, $TiO_x$, and $GaO_x$ (where $0<x<2$), and the (semi) metal oxide may be silicon monoxide.

The conductive material may include one or more selected from the group consisting of carbon black such as carbon black, acetylene black, Ketjen black, channel black, furnace black, lamp black, and thermal black; conductive fibers such as carbon fibers and metal fibers; metal powder such as fluorocarbon powder, aluminum powder, and nickel powder; conductive whiskers such as zinc oxide and potassium titanate; conductive metal oxide such as titanium oxide; and a polyphenylene derivative.

Since the conductive material is dispersed on the surface of the (semi) metal oxide in the composite according to the embodiment of the present invention, the electrical conductivity may be significantly improved by itself. Furthermore, in a case where the composite is mixed with a carbon material to constitute an anode active material, the electrical conductivity may be further improved due to the electrical conductivity of the carbon material together with the conductive material of the (semi) metal oxide. Thus, the performance of the secondary battery may be improved.

Also, the present invention may provide a method of preparing an anode slurry including preparing a composite by dispersing a conductive material in an aqueous binder and then mixing with a (semi) metal oxide, and mixing the composite with a carbon material and a non-aqueous binder.

Specifically, a method of preparing an anode slurry according to an embodiment of the present invention may include preparing a composite by dispersing a conductive material in an aqueous binder and then mixing with a (semi) metal oxide.

The dispersion of the conductive material in the aqueous binder may be performed by mechanical stirring or an ultrasonic wave. Since the mechanical stirring may produce a homogeneous mixture of two or more materials having different physical and chemical properties by using external mechanical energy and the ultrasonic wave may be mainly used to mix or disperse heterogeneous materials that are difficult to be mixed with each other, the mechanical stirring and ultrasonic wave may be used when dispersing the conductive material in the aqueous binder in the anode slurry according to an embodiment of the present invention. However, the present invention is not limited thereto, and any method may be used so long as it may uniformly mix the conductive material in the aqueous binder.

In the method of preparing an anode slurry according to the embodiment of the present invention, the conductive material may be included in an amount ranging from 1 part by weight to 20 parts by weight, for example, 1 part by weight to 10 parts by weight, based on a total weight of the aqueous binder. In the case that the amount of the conductive material is less than 1 part by weight, since the amount of the conductive material is excessively low, an effect due to the use of the conductive material may not be realized. In the case in which the amount of the conductive material is greater than 20 parts by weight, the conductive material may not be well dispersed and the adhesion to the electrode may be decreased due to the excessive amount of the conductive material.

The preparing of the composite may be performed by a spray drying method after mixing the (semi) metal oxide and the aqueous binder in which the conductive material is dispersed. The spray drying method may produce granular powder by substantially removing moisture. The spray drying method may be performed using a spray dryer which includes a drying chamber in which spray drying is substantially performed, a hot air inlet pipe that is connected to the drying chamber and supplies hot air to the drying chamber to remove a dispersant, an air outlet that is connected to the drying chamber to exhaust air cooled during the spray drying, a raw material feed pipe that penetrates a wall constituting the drying chamber and supplies a raw material to the drying chamber to perform spraying, and powder recovery pipes that are connected to the drying chamber to recover powders formed in the drying chamber by the spray drying. However, the present invention is not limited thereto.

The method of preparing an anode slurry according to the embodiment of the present invention may include mixing the composite with a carbon material and a non-aqueous binder.

The carbon material may include one or more selected from the group consisting of soft carbon, hard carbon, natural graphite, artificial graphite, Kish graphite, pyrolytic carbon, mesophase pitch-based carbon fibers, mesocarbon microbeads, mesophase pitch, petroleum-derived cokes, and coal-derived cokes.

Also, the carbon material may be included in an amount ranging from 20 parts by weight to 80 parts by weight based on a total weight of the composite. In a case where the amount of the carbon material is out of the above range, an effect due to the use of the composite may be insignificant, in which electrical conductivity is selectively provided by dispersing the conductive material in the (semi) metal oxide.

The non-aqueous binder may include one or more selected from the group consisting of polytetrafluoroethylene (PTFE), polyvinylidene fluoride (PVdF), polyvinylpyrrolidone, tetrafluoroethylene, polyethylene, and polypropylene. In a case where the composite is mixed with the conductive material and the aqueous binder, the conductive material may be separated from the (semi) metal oxide and the adhesion to an electrode current collector may be reduced. Thus, the non-aqueous binder may be used.

In the method of preparing an anode slurry according to the embodiment of the present invention, a conductive agent may be further included during the mixing of the composite with the carbon material and the non-aqueous binder. The conductive agent may include one or more selected from the group consisting of carbon black such as carbon black, acetylene black, Ketjen black, channel black, furnace black, lamp black, and thermal black; conductive fibers such as carbon fibers and metal fibers; metal powder such as fluorocarbon powder, aluminum powder, and nickel powder; conductive whiskers such as zinc oxide and potassium titanate; conductive metal oxide such as titanium oxide; and a polyphenylene derivative.

Also, the present invention may provide an anode active material, in which the composite including a (semi) metal oxide, a conductive material on a surface of the (semi) metal oxide, and a binder is dispersed in a carbon material. The composite according to an embodiment of the present invention may be dispersed in a carbon material when the composite is mixed with the carbon material to constitute the anode active material. The carbon material may be particulate.

Furthermore, the present invention may provide a secondary battery including a cathode including a cathode active material; a separator; an anode including the anode active material in which the composite including a (semi) metal oxide, a conductive material on a surface of the (semi) metal oxide, and a binder is dispersed in a carbon material; and an electrolyte.

Since the secondary battery according to an embodiment of the present invention may include the composite of the present invention as an anode active material, the electrical conductivity of the secondary battery may be improved and the performance of the secondary battery may be improved.

The anode, for example, may be prepared by coating an anode current collector with a mixture of an anode active material, a conductive agent, and a binder, and then drying the coated anode current collector. If necessary, a filler may be further added. The cathode may also be prepared by coating a cathode current collector with a cathode active material and drying the coated cathode current collector.

The separator is disposed between the cathode and the anode, and a thin insulating film having high ion permeability and mechanical strength may be used as the separator. Since the current collectors, electrode active materials, conductive agent, binder, filler, separator, electrolyte, and lithium salt are known in the art, the detailed descriptions thereof are omitted in the present specification.

The separator is disposed between the cathode and the anode to form a battery structure, the battery structure is wound or folded to put in a cylindrical battery case or prismatic battery case, and then a secondary battery is completed when the electrolyte is injected thereinto. Also, the battery structure is stacked in a bi-cell structure, impregnated with the electrolyte, and a secondary battery is then completed when the product thus obtained is put in a pouch and sealed.

Hereinafter, the present invention will be described in detail, according to specific examples. The invention may, however, be embodied in many different forms and should not be construed as being limited to the embodiments set forth herein.

EXAMPLE 1

Preparation of Composite

In 0.1 g of a styrene-butadiene rubber, 5 parts by weight of carbon black based on a total weight of the styrene-butadiene rubber was dispersed by mechanical stirring and the dispersion thus obtained was then mixed with 5 g of silicon monoxide. Then, a composite was prepared by a spray drying method. In this case, the styrene-butadiene rubber may prevent the detachment of the carbon black from the surface of the silicon monoxide.

EXAMPLE 2

Preparation of Anode Slurry

The composite prepared in Example 1 was mixed with natural graphite, carbon black, and polytetrafluoroethylene at a weight ratio of 40:55:2:3 to prepare an anode slurry.

Comparative Example 1

Preparation of Anode Slurry

An anode slurry was prepared in the same manner as in Example 2 except that commercial silicon monoxide was used instead of using the composite prepared in Example 1.

EXAMPLE 3

Preparation of Secondary Battery

One surface of a copper current collector was coated with the anode slurry prepared in Example 2 to a thickness of 65 μm, dried and rolled. Then, an anode was prepared by punching into a predetermined size.

$LiPF_6$ was added to a non-aqueous electrolyte solvent prepared by mixing ethylene carbonate and diethyl carbonate at a volume ratio of 30:70 to prepare a 1 M $LiPF_6$ non-aqueous electrolyte solution.

A lithium foil was used as a counter electrode, a polyolefin separator was disposed between both electrodes, and a coin-type secondary battery was then prepared by injecting the electrolyte solution.

Comparative Example 2

Preparation of Secondary Battery

A secondary battery was prepared in the same manner as in Example 3 except that the anode slurry prepared in Comparative Example 1 was used.

EXPERIMENTAL EXAMPLE 1

Lifetime Characteristics and Capacity Characteristics Analysis

In order to investigate capacity characteristics and lifetime characteristics of the secondary batteries prepared in Example 3 and Comparative Example 2 according to charge and discharge cycles, the secondary batteries prepared in Example 3 and Comparative Example 2 were charged at 0.1 C to a voltage of 5 mV and charged to a current of 0.005 C at 5 mV under constant current/constant voltage (CC/CV) conditions at 23° C., and then discharged at 0.1 C to a voltage of 1.5 V under a constant current (CC) condition to measure capacities.

Thereafter, the secondary batteries prepared in Example 6 and Comparative Example 2 were charged at 0.5 C to a voltage of 5 mV and charged to a current of 0.005 C at 5 mV under constant current/constant voltage (CC/CV) conditions, and then discharged at 0.5 C to a voltage of 1.0 V under a constant current (CC) condition. This charge and discharge cycle was repeated 1 to 50 times. The results thereof are presented in Table 1 below.

TABLE 1

| Examples | Capacity (mAh/g) | Lifetime characteristics (%) |
|---|---|---|
| Example 3 | 716 | 95.8 |
| Comparative Example 2 | 723 | 83.7 |

Lifetime characteristics: (discharge capacity in a 49th cycle/discharge capacity in the first cycle)×100

As illustrated in Table 1, it may be understood that the lifetime characteristics of the secondary battery of Example 3 using the composite prepared according to Example 1 of the present invention in the anode active material were improved to about 12% in comparison to the secondary battery of Comparative Example 2 using the silicon monoxide prepared according to Comparative Example 1 in the anode active material. With respect to the secondary battery of Example 3, the capacity characteristics were slightly lower than those of the secondary battery of Comparative Example 2. However, this was within the error range.

Therefore, since the composite including a (semi) metal oxide, a conductive material on a surface of the (semi) metal oxide, and a binder was used in the anode active material, the electrical conductivity may be improved in comparison to using a typical silicon-based anode active material. As a result, it was confirmed that the lifetime characteristics of the secondary battery was further improved.

INDUSTRIAL APPLICABILITY

According to the present invention, since electrical conductivity may be improved by dispersing a conductive material in an aqueous binder and then mixing with a (semi) metal oxide, a performance, in particular, lifetime characteristics, of a secondary battery may be improved. Thus, the present invention may be suitable for secondary batteries.

The invention claimed is:

1. An anode slurry comprising:
   a) a composite comprising:
      a (semi) metal oxide;
      an aqueous binder disposed on a surface of the (semi) metal oxide; and
      a conductive material dispersed in the aqueous binder,
   b) a non-aqueous binder;
   c) a conductive agent; and
   d) a carbon material.

2. The anode slurry of claim 1, wherein the (semi) metal oxide comprises one or more selected from the group consisting of $SiO_x$, $AlO_x$, $SnO_x$, $SbO_x$, $BiO_x$, $AsO_x$, $GeO_x$, $PbO_x$, $ZnO_x$, $CdO_{,x}$, $InO_x$, $TiO_x$, and $GaO_x$, where $0<x<2$.

3. The anode slurry of claim 1, wherein the aqueous binder comprises one or more selected from the group consisting of a styrene-butadiene rubber, an acrylonitrile-butadiene rubber, an acrylonitrile-butadiene- styrene rubber, carboxymethyl cellulose, and hydroxypropyl methylcellulose.

4. The anode slurry of claim 1, wherein the non-aqueous binder includes one or more selected from the group consisting of polytetrafluoroethylene (PTFE), polyvinylidene fluoride (PVdF), polyvinylpyrrolidone, tetrafluoroethylene, polyethylene, and polypropylene.

5. The anode slurry of claim 1, wherein the carbon material includes one or more selected from the group consisting of soft carbon, hard carbon, natural graphite, artificial graphite, Kish graphite, pyrolytic carbon, mesophase pitch-based carbon fibers, mesocarbon microbeads, mesophase pitch, petroleum-derived cokes, and coal-derived cokes.

6. The anode slurry of claim 1, wherein the conductive material comprises one or more selected from the group consisting of carbon black selected from the group consisting of carbon black, acetylene black, Ketjen black, channel black, furnace black, lamp black, and thermal black; conductive fibers selected from the group consisting of carbon fibers and metal fibers; metal powder selected from the group consisting of fluorocarbon powder, aluminum powder, and nickel powder; conductive whiskers selected from the group consisting of zinc oxide and potassium titanate; conductive metal oxide including titanium oxide; and a polyphenylene derivative.

7. The anode slurry of claim 1, wherein the conductive material is uniformly dispersed in the aqueous binder.

8. The anode slurry of claim 1, wherein the conductive material is coupled to the surface of the (semi) metal oxide by the aqueous binder.

9. A secondary battery comprising:
   a cathode including a cathode active material;
   a separator;
   an anode including the anode slurry of claim 1; and
   an electrolyte.

10. A method of preparing an anode slurry, the method comprising:
    preparing a composite by dispersing a conductive material in an aqueous binder and then mixing the aqueous binder in which the conductive material is dispersed with a (semi) metal oxide, wherein the aqueous binder is disposed on a surface of the (semi) metal oxide; and
    mixing the composite with a carbon material, a conductive agent, and a non-aqueous binder.

11. The method of claim 10, wherein the conductive material is included in an amount ranging from 1 part by weight to 20 parts by weight based on a total weight of the aqueous binder.

12. The method of claim 10, wherein the preparing of the composite is performed by a spray drying method.

13. The method of claim 10, wherein the carbon material comprises one or more selected from the group consisting of soft carbon, hard carbon, natural graphite, artificial graphite, Kish graphite, pyrolytic carbon, mesophase pitch-based carbon fibers, mesocarbon microbeads, mesophase pitch, petroleum-derived cokes, and coal-derived cokes.

14. The method of claim 10, wherein the carbon material is included in an amount ranging from 20 parts by weight to 80 parts by weight based on a total weight of the composite.

15. The method of claim 10, wherein the non-aqueous binder comprises one or more selected from the group consisting of polytetrafluoroethylene (PTFE), polyvinylidene fluoride (PVdF), polyvinylpyrrolidone, tetrafluoroethylene, polyethylene, and polypropylene.

* * * * *